Aug. 26, 1930.　　　　S. G. DOWN　　　　1,774,174
SAFETY BRAKE DEVICE
Filed May 5, 1928
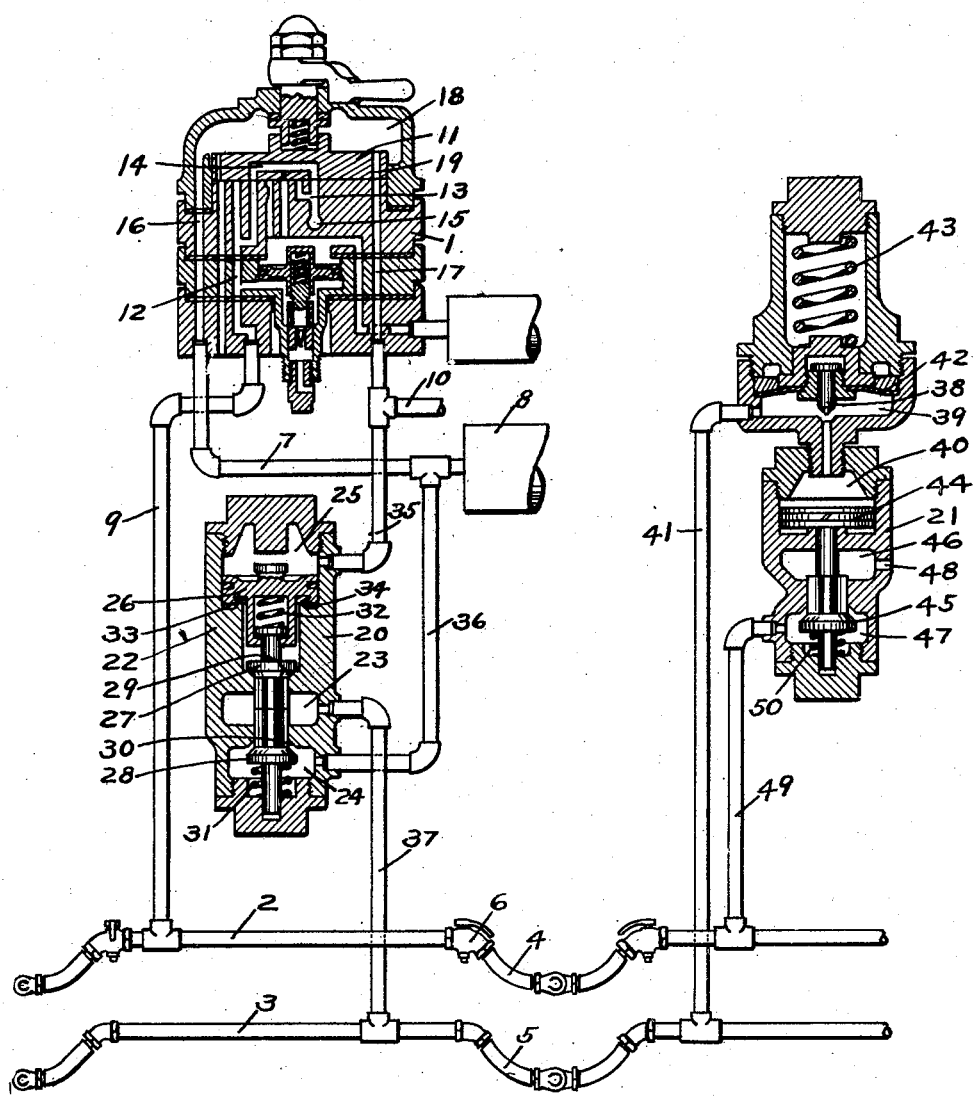
INVENTOR
SIDNEY G. DOWN
BY
ATTORNEY Patented Aug. 26, 1930

1,774,174

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY BRAKE DEVICE

Application filed May 5, 1928. Serial No. 275,349.

This invention relates to fluid pressure brakes and has for one of its primary objects to provide means whereby the engineer may still have control of the train in case an angle cock has been closed at any point within the train.

Another important object of my invention is to provide means for operating the brakes through the signal pipe in case an angle cock should be closed for any reason.

A further object of my invention is the provision of a vent valve located on each car of the train having communication with the signal pipe and brake pipe, with means located on the locomotive and cooperating with the engineer's brake valve for charging the signal pipe from the main reservoir, when the brake valve is moved to an emergency position, the fluid under pressure in the signal pipe acting upon the vent valves to permit the same to vent the brake pipe and consequently bring about a brake application even though an angle cock at any point in the train should be closed.

Other objects of the invention will appear as the description proceeds.

In the drawing, the single figure is a diagrammatic view illustrating the application of my invention to a fluid pressure brake system.

The fluid pressure brake system may include the usual engineer's brake valve 1 located on the locomotive and brake and signal pipes 2 and 3. The sections of the brake and signal pipes 2 and 3 carried by the locomotive and cars can be connected by the usual flexible hose and couplings 4 and 5, the brake pipe at the couplings being provided with the usual angle cocks 6.

The brake valve device 1 is connected by a pipe 7 with the main reservoir 8 and by a branch pipe 9 with the brake pipe 2. The sand pipe 10 also communicates with the brake valve device, as shown. As the brake valve device 1 is of the ordinary construction, the same will not be described in detail, but it can be seen that when the rotary valve 11 thereof is turned to emergency position, as shown in the drawing, the brake pipe 2 is vented to the atmosphere by means of pipe 9, passages 12 and 13, cavity 14, in valve 11, and atmospheric port 15. In this position, the sand pipe 10 is connected with the main reservoir 8, by means of pipe 7, passages 16 and 17, chamber 18 and port 19 in the rotary valve.

In accordance with this invention, I may provide, a relay valve device 20 located on the locomotive and a vent valve 21 carried by each car of the train. The relay valve device 20 may consist of a body 22 having spaced chambers 23 and 24 and a piston chamber 25. A piston 26 is mounted in the chamber 25 and is adapted to operate double beat valves 27 and 28, which are adapted to fit upon seats 29 and 30, respectively. The valve 27 is adapted to control the flow of fluid under pressure from chamber 23 to the lower face of the piston 26, while the valve 28 is adapted to control the flow of fluid under pressure from chamber 24 to chamber 23. A spring 31 is employed for normally holding the valve 28 on its seat 30 and the valve 27 off of its seat 29. The piston 26 is slidably connected with the valve 27 and a spring 32 normally functions to hold the valve in a lowered position relative to the piston. A sealing ring 33 is carried by the lower face of the piston and is adapted to fit upon a seat rib 34, when the piston is in its lowered position, for cutting off communication between the piston chamber 25 and the chamber 23.

A branch pipe 35 is employed for connecting the sand pipe 10 with the piston chamber, while a branch pipe 36 connects the main reservoir pipe 7 with the chamber 24. A pipe 37 connects the chamber 23 with the signal pipe 3.

Referring to the vent valve 21, the same may include a needle valve 38 for controlling the flow of fluid under pressure from a valve chamber 39 to a piston chamber 40 and this valve chamber 39 has communication with the signal pipe 3 through a branch pipe 41. The valve 38 is carried by a diaphragm 42 subject to fluid under pressure in the chamber 39 and the valve is held on its seat against normal signal pipe pressure by a coil spring 43. However, when the pressure in chamber 39 rises above normal signal pipe pressure, this fluid under pressure acting on the diaphragm 42 will raise the valve 38 off of its seat against the tension of coil spring 43. A piston 44 slidably mounted in the chamber 40 is employed for operating a valve 45, which controls communication between chambers 46 and 47. The chamber 46 is provided with a vent port 48 and the chamber 47 is connected with the brake pipe 2, by a branch pipe 49. The valve 45 is normally held on its seat for preventing communication between the chambers 46 and 47 by a coil spring 50.

In operation of the device, upon brake failure, caused by a closed angle cock 6 at any point in the train, the rotary valve 11 of the engineer's brake valve 1 is moved to emergency position, as shown, which will allow fluid under pressure from main reservoir 8 to flow to sand pipe 10 through pipe 7, passage 16, chamber 18, port 19 and passage 17. This flow of fluid under pressure will enter piston chamber 25, of the relay valve device 20, through pipe 35, which will cause downward movement of the piston 26 and operation of the double beat valves 27 and 28, the valve 27 moving to a seated position and the valve 28 to an unseated position. The unseating of the valve 28 establishes communication between chambers 23 and 24, which will allow flow of fluid under pressure from the main reservoir 8 to signal pipe 3, through the medium of pipes 36 and 37. The raising of pressure in the signal pipe 3 will raise the pressure in chamber 39 of the vent valve device 21, due to the connection of the chamber with the signal pipe 3 by pipe 41, and consequently lift the needle valve 38 off of its seat and allow the fluid under pressure to act upon the piston 44. The fluid under pressure will lower piston 44 and unseat the valve 45 and thus establish communication between the chambers 46 and 47. This will permit the venting of the brake pipe 2 to the atmosphere, through the vent port 48, due to the connection of the brake pipe 2 by pipe 49 with the chamber 47. The venting of the brake pipe 2 will cause the application of the brakes in the usual way.

When the engineer's brake valve 1 is moved back to running position, communication is cut off between the main reservoir 8 and the sand pipe and the parts of the apparatus will consequently return to their normal position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, a signal pipe and a main reservoir, of a relay valve located on the locomotive and operated upon an increase in fluid pressure for supplying fluid under pressure from the main reservoir to the signal pipe, an engineer's brake valve adapted in one position to supply fluid under pressure to said relay valve for establishing communication between the main reservoir and signal pipe, and a vent valve adapted to be located on each car of a train connected with the signal pipe and operable when subjected to main reservoir pressure for venting said brake pipe.

2. In a fluid pressure brake, the combination with a brake pipe, a signal pipe and a main reservoir, of a relay valve device located on the locomotive of a train connected with the main reservoir and signal pipe including a valve for controlling the flow of fluid under pressure from the main reservoir to the signal pipe, and means operated by fluid under pressure for opening the valve, an engineer's brake valve adapted in one position to supply fluid under pressure to said means, and a vent valve adapted to be located on each car of a train connected with the signal pipe and operable when subjected to main reservoir pressure for venting said brake pipe 3. In a fluid pressure brake, the combination with a brake pipe, a signal pipe and a main reservoir, of a relay valve device located on the locomotive of a train connected with the main reservoir and signal pipe including a valve for controlling the flow of fluid under pressure from the main reservoir to the signal pipe, and means, when subjected to fluid under pressure, for operating the valve, an engineer's brake valve connected with the main reservoir, a sand pipe connected with the engineer's brake valve and said valve operating means of the relay valve device, the engineer's brake valve adapted in one position to establish communication between the main reservoir and sand pipe, and means located on each car of a train connected with the signal pipe for venting said brake pipe when subjected to main reservoir pressure 4. In a fluid pressure brake, the combination with a brake pipe, a signal pipe, and a main reservoir, of an engineer's brake valve adapted in one position to supply fluid under pressure from the main reservoir to the signal pipe, and a vent valve device located on each car of a train including a vent chamber and a valve chamber, a valve in the valve chamber for controlling communication between the chambers, means connecting the brake pipe with the valve chamber, and means subject to pressure in the signal pipe for unseating said valve.

5. In a fluid pressure brake, the combination with a brake pipe, a signal pipe, and a main reservoir, of an engineer's brake valve adapted in one position to supply fluid under pressure from the main reservoir to the signal pipe, and a vent valve device located on each car of a train including a vent chamber and a valve chamber, a valve in the valve chamber for controlling communication between the chambers, means connecting the brake pipe with the valve chamber, means subject to pressure for unseating the valve, a valve for controlling flow of fluid under pressure to said valve operating means, a diaphragm connected with said last mentioned valve, and means for subjecting the diaphragm to fluid under pressure from said signal pipe.

6. In a fluid pressure brake, the combination with a brake pipe, a signal pipe and a main reservoir, of a relay valve device located on the locomotive of a train connected with the main reservoir and signal pipe including a valve for controlling the flow of fluid under pressure from the main reservoir to the signal pipe, and means, when subjected to fluid under pressure, for operating the valve, an engineer's brake valve connected with the main reservoir, a sand pipe connected with the engineer's brake valve and said valve operating means of the relay valve device, the engineer's brake valve adapted in one position to establish communication between the main reservoir and sand pipe, and a vent valve device located on each car of a train including a vent chamber and a valve chamber, a valve in the valve chamber controlling communication between the chambers, means connecting the brake pipe with the valve chamber, means subject to pressure for unseating the valve, a valve for controlling the flow of fluid under pressure to said valve operating means, a diaphragm connected with said last mentioned valve, and means for subjecting the diaphragm to fluid under pressure from said signal pipe.

In testimony whereof I have hereunto set my hand.

SIDNEY G. DOWN.